United States Patent
Tomaru

(10) Patent No.: US 10,305,681 B2
(45) Date of Patent: May 28, 2019

(54) HIGH-SECURITY COMMUNICATION SYSTEM, AND TRANSMITTER AND RECEIVER BOTH USED THEREIN

(71) Applicant: Hitachi, Ltd., Chiyoda-ku, Tokyo (JP)

(72) Inventor: Tatsuya Tomaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 14/897,390

(22) PCT Filed: Jun. 12, 2013

(86) PCT No.: PCT/JP2013/066268
§ 371 (c)(1),
(2) Date: Dec. 10, 2015

(87) PCT Pub. No.: WO2014/199474
PCT Pub. Date: Dec. 18, 2014

(65) Prior Publication Data
US 2016/0112189 A1    Apr. 21, 2016

(51) Int. Cl.
*G06F 21/00* (2013.01)
*H04L 9/06* (2006.01)
(Continued)

(52) U.S. Cl.
CPC ............ *H04L 9/0662* (2013.01); *H04K 1/02* (2013.01); *H04L 9/06* (2013.01); *H04L 9/0822* (2013.01); *H04L 2209/34* (2013.01)

(58) Field of Classification Search
CPC ....... H04L 9/0662; H04L 9/0822; H04L 9/06; H04L 2209/34; H04K 1/02
See application file for complete search history.

(56) References Cited

U.S. PATENT DOCUMENTS 6,532,290 B1 * 3/2003 Dent ............... H04L 9/3273
 380/247
7,471,790 B2 * 12/2008 Yoshida ............ H04L 9/0852
 380/28
(Continued)

FOREIGN PATENT DOCUMENTS

JP    2002-538745 A    11/2002
JP    2007-129386 A     5/2007
(Continued)

OTHER PUBLICATIONS

Tomaru, Tatsuya. Secret Key Distribution Protocol for Practical Optical Channels Using a Preshared Key and Phase Fluctuations. Jul. 20, 2010. Jpn. J. Appl. Phys. 49-074401. (Year: 2010).*
(Continued)

*Primary Examiner* — Kendall Dolly
(74) *Attorney, Agent, or Firm* — Crowell & Moring LLP

(57) ABSTRACT

The objective of the invention is to provide an encoding method and a communication method wherein bit-error correction is easy for a authorized recipient but difficult for an unauthorized recipient. A transmission channel in which bit errors are moderately controlled is used to transmit/receive a random number sequence. A common key is shared between a transmitter and a receiver in advance; each bit value of the common key is connected with each slot of the random number sequence; the common key is used to divide the random number sequence into two or more random number series in accordance with the connection; and each random number series is independently encoded and parity check symbols are generated. The unit of the encoding is equal to or greater than the length of the common key so as to make a partial analysis by an unauthorized recipient impossible.

9 Claims, 4 Drawing Sheets

(51) Int. Cl.
*H04K 1/02* (2006.01)
*H04L 9/08* (2006.01)

(56) References Cited

U.S. PATENT DOCUMENTS

| | | | |
|---|---|---|---|
| 2008/0031637 A1* | 2/2008 | Tomaru | H04B 10/548 398/188 |
| 2011/0311050 A1 | 12/2011 | Tomaru | |
| 2012/0314867 A1 | 12/2012 | Tomaru | |

FOREIGN PATENT DOCUMENTS

| | | |
|---|---|---|
| JP | 2010-35072 A | 2/2010 |
| WO | WO 2010/103628 A1 | 9/2010 |
| WO | WO 2010/103677 A1 | 9/2010 |
| WO | WO 2011/099325 A1 | 8/2011 |

OTHER PUBLICATIONS

International Search Report (PCT/ISA/210) issued in PCT Application No. PCT/JP2013/066268 dated Jul. 23, 2013 with English translation (Four (4) pages).

Gisin et al., "Quantum cryptography", Reviews of Modern Physics, vol. 74, No. 1, Jan. 2002, The American Physical Society, pp. 145-195 (Fifty-one (51) pages).

Barbosa et al., "Secure Communication Using Mesoscopic Coherent States", Physical Review Letters, vol. 90, No. 22, Jun. 6, 2003, The American Physical Society, pp. 227901-1-227901-4 (Four (4) pages).

Tomaru, "Speed-Improved Secret Key Distribution Using Phase Fluctuations and Seed Key", 2010, Japan Society of Applied Physics and Related Societies, 18a-L-14, The Japan Society of Applied Physics (One (1) page).

Tomaru, "Phase-Fluctuation-Characterizing Method Suitable for DPSK", 2010, Japan Society of Applied Physics and Related Societies, 14p-E-12, The Japan Society of Applied Physics (One (1) page).

* cited by examiner

| TRANSMITTER | | RECEIVER | |
|---|---|---|---|
| PROCESSING CONTENT | SIGNAL SEQUENCE | PROCESSING CONTENT | SIGNAL SEQUENCE |
| (a) RANDOM NUMBER DATA | 1 0 0 1 0 1... | (e) RECEIVED PHASE (334) | 0 $\pi$ $\pi$ $\pi$ 0 0 $\pi$... |
| (b) DIFFERENTIAL DATA (143) | 0 1 1 1 0 0 1... | (f) DIFFERENTIAL PHASE (336) | $\pi$ 0 0 $\pi$ 0 $\pi$... |
| (c) CONVERSION INTO DPSK (141) | 0 0 1 0 1 1 1 0... | (g) BINARY DISCRIMINATION (335) | 1 0 0 1 0 1... |
| (d) MODULATION PHASE (142) | 0 0 $\pi$ 0 $\pi$ $\pi$ $\pi$ 0... | | |

HIGH-SECURITY COMMUNICATION SYSTEM, AND TRANSMITTER AND RECEIVER BOTH USED THEREIN

TECHNICAL FIELD

The present invention relates to a high-security communication system and a transmitter and a receiver for use in the same, and more particularly, to a communication system and a transmitter and a receiver for use in the same, which are capable of improving security in optical communication.

BACKGROUND ART

The amount of information increases and its networking has been progressing as represented by words such as big data and cloud computing, and the concentration of information in a certain place has been progressing as represented by data centers. If information is excessively concentrated, a security hole of one place leads to a fatal information leak. Therefore, information security in communication channels is a consequential problem.

As a method of improving security of communication channels, quantum cryptography is well known (for example, see Non-Patent Document 1), but because a theoretical rationale thereof is based on quantum mechanics that is the theory for describing a microscopic world, there are restrictions, for example, a maximum transmission distance is about 100 km, or it is difficult to increase a transmission rate, and many problems arise in incorporating it into a network. A method called an $\alpha$-$\eta$ protocol has been proposed in order to solve the restrictions, but because security is based on a quantum mechanical property, the number of photons per signal has to be restricted to be several photons, the problem is not solved (for example, see Non-Patent Document 2).

A method invented in this regard is the secure optical communication technique using fluctuations (phase fluctuations, amplitude fluctuations, antisqueezed fluctuations, and the like); for example, see Patent Documents 1 to 4. In this method, security is improved using the fact that it is difficult to predict fluctuations, and because the method can operate with a light intensity in an ordinary optical communication without using a quantum mechanical property, there is no restriction to a transmission distance in principle, and it matches a present optical communication system as well. However, how to use the unpredictability of fluctuations is a problem, and Patent Documents 2 to 4 showed a method using a seed key, parity check symbols (an error correcting code), and multiple bases, making the unpredictability of fluctuations usable.

The principle is as follows.

(1) A sender and a authorized recipient share a seed key, and decide shared bases based on the seed key.

(2) The sender transmits random numbers with randomly chosen bases (random bases). Random numbers located at the slots in which the shared basis coincides with the random basis are dealt as a random number series 1, and random numbers located at the slots in which the shared basis does not coincide with the random basis are dealt as a random number series 2. Further, parity check symbols for either or both of the random number series 1 and 2 are also transmitted.

(3) The authorized recipient judges the random bases using received signals, and separates the transmitted random numbers into the random number series 1 and 2 by referring to the shared bases. At this time, because there are fluctuations, there are basis judgment errors. The presence or absence of judgment errors is determined by checking the parities of the random number series 1 or the random number series 2 and by checking if the parities coincide with the check symbols. When there is a basis judgment error, the random number of the corresponding slot is dealt with in a different series from a correct series, and the amounts of the random number series 1 and 2 change, and a correspondence relation between random numbers and the parity check symbols is disturbed. As a result, many parity errors occur, and a position in which the basis judgment error has occurred can roughly be deduced. A basis judgment of a slot suspected to have a judgment error is changed, and the parity check is repeated. The bases of all slots suspected to be basis-judgment errors are corrected by performing the repeating processes. Further, through those processes, bit errors are corrected as well.

(4) An unauthorized recipient does not hold the seed key and thus does not know the shared bases. Because the random numbers cannot be separated into the random number series 1 and 2, it is difficult to use the parity check symbols, correct the basis judgment errors, and correct the bit errors. Accordingly, there is a difference between the authorized recipient and the unauthorized recipient.

(5) The transmitted and received random numbers are reduced to an information amount (secret capacity) corresponding to the difference between the amount of information obtained by the authorized recipient and the amount of information obtained by the unauthorized recipient and the reduced random numbers are used as a secret key. Cipher communication of actual data is performed using the secret key.

This method is excellent in terms of that the fluctuations (bit errors) are ingeniously used in order to improve the security, but an exhaustive process is necessary for basis correction, and changing the basis judgment and checking the parity are needed several times even to correct only one slot. Because there are many bit errors (basis judgment errors) in the method using the fluctuations, this exhaustive process is very heavy, and becomes a great obstacle to introduction into an actual system. If redundancy is increased in encoding, the exhaustive process might be allayed, but in this case, encoding efficiency is lowered, and secret capacity is reduced as well. Further, even though the redundancy is increased, the exhaustive process is still necessary at a receiver. Thus, it is not a crucial solution.

CITATION LIST

Patent Document

Patent Document 1: JP 2007-129386 A
Patent Document 2: WO 2010/103628 A
Patent Document 3: WO 2010/103677 A
Patent Document 4: WO 2011/099325 A

Non-Patent Document

Non-Patent Document 1: N. Gisin, G. Ribordy, W. Tittel and H. Zbinden, Rev. Mod. Phys. 74, 145-195 (2002)
Non-Patent Document 2: G. A. Barbosa, E. Corndorf, P. Kumar, and H. P. Yuen, Phys. Rev. Lett. 90, 227901 (2003)

SUMMARY OF THE INVENTION

Problems to be Solved by the Invention

As described above, when the bit errors (fluctuations) are ingeniously used, secret (secure) communication is possible, but the method using the shared bases and the random bases has a problem of practicality that the process in the receiver is heavy.

In this regard, an object of the present invention is to provide a communication system and a transmitter and a receiver for use in the same, which employ an encoding technique in which a authorized recipient easily corrects bit errors and an unauthorized recipient can hardly correct bit errors.

Solutions to Problems

In order to solve the above problems, the present invention has a main feature about a transmitter as follows:

(1) A transmitter that transmits a random number sequence includes an encoder that encodes the random number sequence, and the encoder uses a common key shared in advance between the transmitter and a receiver that receives signals transmitted from the transmitter, divides the random number sequence into two or more of random number series using the common key, where each bit value of the common key is connected with each slot of the random number sequence based on a predetermined correspondence relation, and encodes each of the divided random number series independently.

Further, the present invention has a main feature about a receiver as follows:

(2) A receiver that receives a random number sequence includes a detector that detects the encoded random number sequence and a decoder that decodes the detected random number sequence, and the decoder uses a common key shared in advance between the receiver and a transmitter that transmits signals received by the receiver, and divides the random number sequence into two or more of random number series using the common key, where each bit value of the common key is connected with each slot of the random number sequence based on a predetermined correspondence relation, and each of the random number series is decoded independently.

Further, the present invention has a main feature about a communication system as follows:

(3) A communication system includes a transmitter that transmits a random number sequence, a receiver that receives the random number sequence, and a transmission channel through which the random number sequence is transmitted between the transmitter and the receiver, wherein the transmitter includes an encoder that encodes the random number sequence, the encoder uses a common key shared in advance between the transmitter and the receiver that receives signals transmitted from the transmitter, divides the random number sequence into two or more of random number series using the common key, where each bit value of the common key is connected with each slot of the random number sequence based on a predetermined correspondence relation, and encodes each of the divided random number series independently, the receiver includes a detector that detects the encoded random number sequence and a decoder that decodes the detected random number sequence, and the decoder uses the common key shared in advance between the receiver and the transmitter that transmits signals received by the receiver, and divides the random number sequence into two or more of random number series using the common key, where each bit value of the common key is connected with each slot of the random number sequence based on the predetermined correspondence relation, and the transmission channel includes a first transmission channel through which the random number sequence is transmitted from the transmitter to the receiver and a second transmission channel through which actual data are transmitted to the receiver.

In other words, the above configuration has the following features. The random number sequence is transmitted and received using the transmission channel in which the bit errors are appropriately controlled, and a common key is shared between the transmitter and the receiver in advance. The common key is connected with the random number sequence fixedly regarding the corresponding position of each bit; the random number sequence is divided into two or more of random number series based on the correspondence relation; each random number series is encoded to generate the parity check symbols. An encoding unit of length is set to be equal to or larger than the length of the common key so that the unauthorized recipient can hardly perform the partial analysis.

Effects of the Invention

According to the present invention, it is possible to provide a communication system and a transmitter and a receiver for use in the same, which employ an encoding technique in which a authorized recipient easily corrects bit errors, and an unauthorized recipient can hardly correct bit errors.

MODE FOR CARRYING OUT THE INVENTION

Hereinafter, exemplary embodiments will be described with reference to the appended drawings.

First Embodiment

Figure 1:
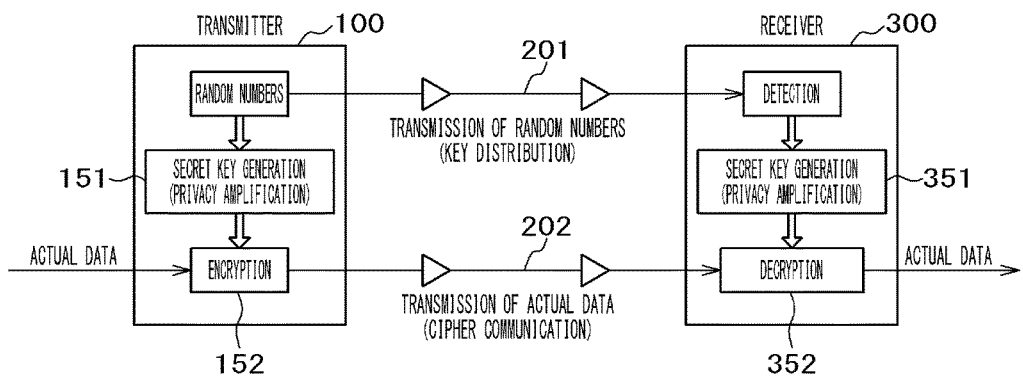
FIG. 1 is a block diagram illustrating an overall picture of the secret communication according to the present invention.

First, the principle for implementing secret communication will be described. In the present invention, the unpredictability of fluctuations is used. When there are fluctuations at the time of communication, bit errors occur. Let the bit error rate be p. The binary entropy function is defined by $h(p)=-p \log_2 p-(1-p)\log_2(1-p)$. The information capacity of the receiver is $I(p)=1-h(p)$ ($p \leq \frac{1}{2}$) per bit in the case of a symmetric communication channel. Let the bit error rate of the authorized recipient be $p_B$, and let the bit error rate of the unauthorized recipient be $p_E$. If $p_B < p_E$ can be satisfied, the authorized recipient has more information than the unauthorized recipient by $C_s = I(p_B) - I(p_E)$, and secret capacity $C_s$ is obtained. Thus, how to satisfy $p_B < p_E$ is a subject. However, even when $p_B < p_Z$ can be satisfied, the unauthorized recipient obtains information capacity $I(p_E)$ theoretically, and thus the information capacity of $I(p_E)$ needs to be nullified using a protocol illustrated in FIG. 1.

(1) Transmission and reception of the random numbers are performed between the sender and the authorized recipient using a transmission channel 201. This is referred to as "key distribution."

(2) Because there is a possibility that the unauthorized recipient obtains the information of capacity $I(p_E)$, the total number of transmitted and received random numbers is reduced to within secret capacity $C_s$ through a process referred to as "privacy amplification" (secret key generators 151 and 351). Because the random numbers that have passed the privacy amplification are secret information, the random numbers are used as the secret key.

(3) Actual data are encrypted using the secret key and then transmitted and received. Because the security of the secret key is guaranteed by the privacy amplification, the actual data can be securely transmitted.

Here, the reason that the key distribution is performed prior to the actual data transmission is that the total number of data must be reduced in the privacy amplification. If the actual data is used, the reduction process cannot be performed.

In the above configuration, if $p_B < p_E$ is satisfied, it is possible to perform secure communication. In this regard, how to satisfy $p_B < p_E$ is a subject.

Figure 2:
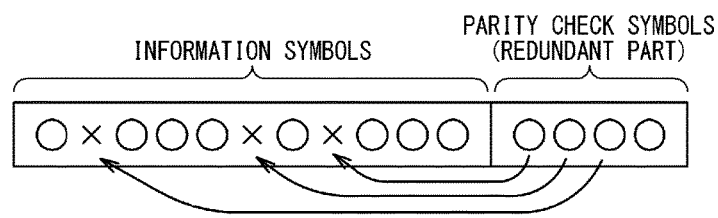
FIG. 2 is a conceptual diagram illustrating an error correcting code.

The present invention achieves this situation using a common key and an error correcting code. An error correcting code is a code in which information to be transmitted is made redundant, and when there is a bit error, the error correcting code is used to detect a position of the bit error and correct the bit error. FIG. 2 is a conceptual diagram illustrating an error correcting code. An error correcting code includes information symbols and parity check symbols corresponding to redundant data, and those symbols integrally operate. There are two types of error correcting codes, that is, a systematic code in which the information symbol part is explicitly distinguished from the parity check symbol part and an unsystematic code in which the information symbol part is not distinguished from the parity check symbol part. The present invention can use both types of codes. The following description will proceed mainly using the systematic code to make understanding easy.

An important point in the present invention lies in that the information symbols and the parity check symbols operate integrally. Even if the unauthorized recipient obtains parity check symbols having no correspondence relation with the information symbols, she cannot use the parity check symbols as meaningful information. To achieve this situation, the present invention determines the correspondence relation between the information symbols and the parity check symbols with a common key. In this case, the authorized recipient that holds the common key can correct errors because the information symbols are connected with the parity check symbols, and the unauthorized recipient that holds no common key can hardly correct errors because the information symbols are not connected with the parity check symbols. As a result, the bit error rate after the error correction satisfies $p_B < p_E$, and thus the secure communication can be performed.

Figure 3:
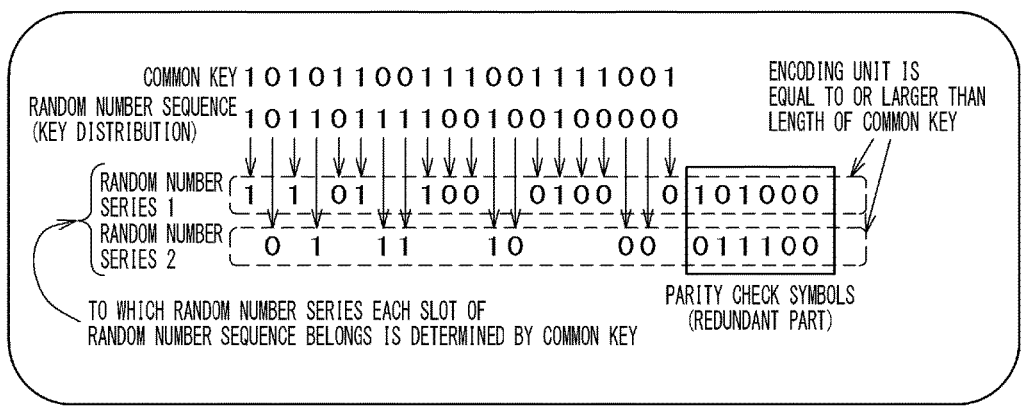
FIG. 3 is a diagram illustrating an embodiment of encoding according to the present invention.

The method disclosed in Patent Documents 2 to 4 might connect the information symbols with the parity check symbols, but as described above in "BACKGROUND ART," the method has a practical problem such that the process in the receiver is very heavy. For this reason, the present invention uses a method illustrated in FIG. 3. The random numbers that are transmitted and received in the key distribution are divided into multiple random number series. To which random number series each bit slot belongs is determined by the common key. In FIG. 3, if the value in a bit slot of the common key is "1," the corresponding slot in the random number sequence belongs to the random number series 1, and if the bit value is "0," the corresponding slot belongs to the random number series 2. The correspondence relation is fixedly determined slot-by-slot regardless of the random number sequence, and the authorized recipient that holds the common key can accurately separate the received random number sequence into the random number series 1 and 2. However, the random number sequence is a simple random number sequence for the unauthorized recipient. The unauthorized recipient that holds no common key can hardly separate the random number sequence into the random number series 1 and 2 because the transmitted random number sequence does not include the information about the common key.

The random number series 1 and 2 are independently error-correcting coded. The parity check symbols generated through the error-correcting coding may be transmitted using the transmission channel 201 (a key distribution transmission channel) in FIG. 1 or using a transmission channel 202 (an ordinary transmission channel). The authorized recipient can accurately separate the random number sequence into the random number series 1 and 2 and thus can correct errors using the respective parity check symbols, but the unauthorized recipient can hardly separate the random number sequence into the random number series 1 and 2 and thus can hardly use the parity check symbols although the parity check symbols are obtained. This is a difference between the authorized recipient and the unauthorized recipient.

The example in FIG. 3 has only two types of random number series 1 and 2. This is because the usage of the common key allocated to each slot is binary. However, for example, when the usage of the common key allocated to each slot is quaternary, four types of random number series are made. Thus, any number of types of random number series can be used.

As can be understood from the usage of FIG. 3, the common key is used only inside the transmitter and the receiver, and the information of the common key is not reflected on signals in the transmission channel. Further, the secret key that is generated after the key distribution (transmission and reception of the random numbers) is originated in the information amount of the bit errors for the unauthorized recipient, and does not use the information about the common key. Thus, the common key can repeatedly be used in principle. Pseudo random numbers can be used instead of the common key illustrated in FIG. 3 as long as the pseudo random numbers can repeatedly be used. The common key is used as a seed key for the pseudo random numbers in this case.

In the present scheme that uses a common key, the common key can be decrypted in principle if an exhaustive search is performed. However, the decryption is practically difficult as apparent from a simple estimation. For example, let the length of the common key be 128 bits. The total number of exhaustive search is the 128th power of 2 ($2^{128}$). If a period of time required for checking one candidate for a common key is 1 ns, a period of time necessary for the exhaustive search is the 22nd power of 10 ($10^{22}$) years. This is sufficient long, and the decryption by the exhaustive search is practically impossible. Further, when the length of the common key is increased, a period of time necessary for the exhaustive search increases in an exponential manner. However, when a partial search of the common key is possible, the above estimation is not applicable, and thus a mechanism that does not allow the partial search is necessary. For this purpose, an encoding unit of length is set to be equal to or larger than the length of the common key in the present invention. In other words, the parity check symbols are generated from the number of random number data equal to or larger than the length of the common key in encoding. For example, let the length of the common key be k. When the random number sequence is divided into n series, an encoding unit of each series is equal to or larger than k/n. If encoding is performed as described above, the parity check symbols cannot be used unless k or more pieces of data are dealt, and the partial analysis of the common key is not allowed. The Reed-Solomon code is a typical code that enables such a usage.

The redundancy of the error correcting code is determined according to the bit error rate. Conversely, the bit error rate of the system needs to be controlled according to the redundancy of the error correcting code. Controlling the bit error rate and the redundancy of the code with the correlation builds a situation in which the authorized recipient can correct errors but the unauthorized recipient can hardly correct errors.

The present invention uses an error-correcting code in which the maximum number of correctable errors in each encoding unit is limited explicitly. Because the redundancy is controlled such that the authorized recipient can correct errors, error-correction capability over the necessity should be avoided. If there is an additional correction capability, additional information is likely to be given to the unauthorized recipient. In order to prevent such a possibility, it is desirable to employ an error-correcting code in which the guaranteed minimum number of correctable errors (in each encoding unit) coincides with the maximum number of correctable errors. The Reed-Solomon code is an example that satisfies this condition.

Because the division (allocation) of the random number sequence is determined only with the common key (including a pseudo random number sequence generated with the common key), the authorized recipient that holds the common key can easily perform the process of allocating the received random number sequence to each random number series and easily correct bit errors using the parity check symbols for each random number series.

On the other hand, the unauthorized recipient faces a different situation. Even though the common key is fixedly used with respect to the position of the bit slots, the random number sequence that the unauthorized recipient can view is simply a random number sequence. If there is no common key, the random numbers cannot be allocated to multiple random number series and the parity check symbols cannot be used. As a result, the unauthorized recipient can hardly decode the random numbers. Further, this method uses only one type of basis, because Random bases are not used.

Second Embodiment

In the first embodiment, the principle has been described in regard to the encoding, the decoding, and the communication protocol for carrying out the present invention. The present embodiment describes the present invention by referring to a concrete exemplary configuration of a transmitter and a receiver. The following description uses optical transmission channels as an example, but electromagnetic waves (in a wired or wireless manner) in addition to light may be used as a communication medium.

Figure 4:
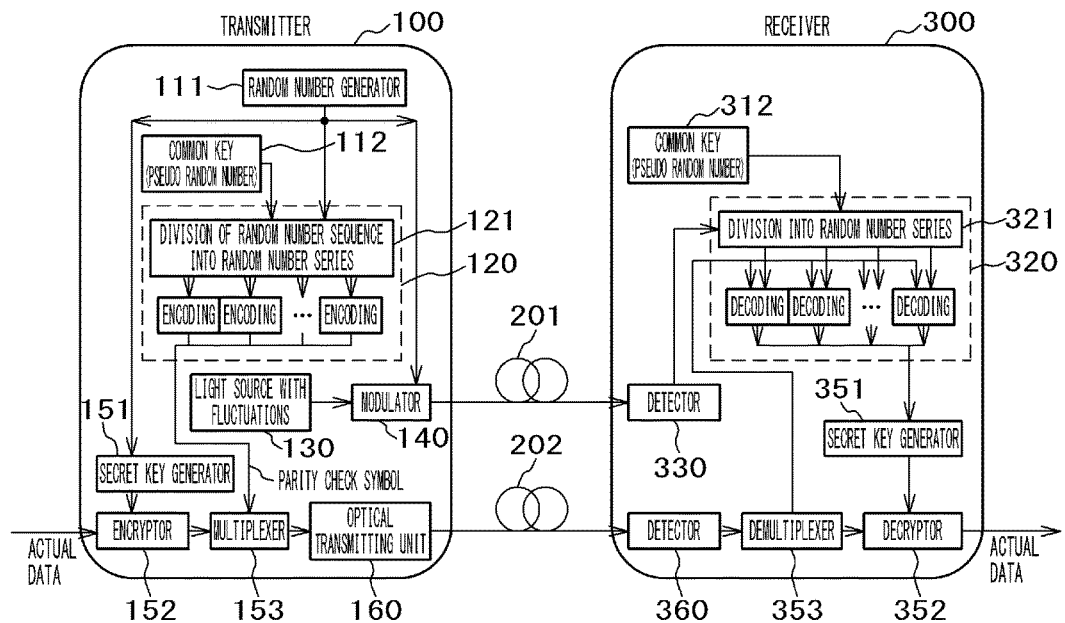
FIG. 4 is a block diagram illustrating an exemplary configuration of a transmitter and a receiver for implementing the secret communication according to the present invention.

FIG. 4 illustrates an example for carrying out the present invention. A transmitter 100, transmission channels 201 and 202, and a receiver 300 constitute the present embodiment. The transmission channel 201 is a transmission channel for transmitting and receiving random numbers (key distribution) and uses a light source 130 having large fluctuations so that the bit error rate is high. The transmission channel 202 is an ordinary transmission channel for transmitting and receiving actual data. Because accrual data should be surely transmitted, the bit error rate in the transmission channel 202 should be as low as possible.

Common keys 112 and 312 that are important in implementing secure communication are prepared in the transmitter 100 and the receiver 300 in advance. The common key can be used in a bare form, but it can also be used as a seed key to generate pseudo random numbers, which are used instead of the bare common key. When the pseudo random numbers are employed, pseudo random number generators 112 and 312 use the same algorithm in generating the pseudo random numbers. The output from the random number generator 111 is the random numbers that are transmitted and received in the key distribution. The output from the random number generator 111 is sent to three units. Firstly, the output from the random number generator 111 is sent to a modulator 140 and transmitted to the receiver via the transmission channel 201 as information symbols. Secondly, the output from the random number generator 111 is sent to a secret key generator 151, and the privacy amplification is performed to generate a secret key for encrypting the actual data. An encryptor 152 encrypts the actual data using the secret key. Thirdly, the output from the random number generator 111 is sent to an encoder 120 that generates the parity check symbols. The encoder 120 first divides the random number sequence output from the random number generator 111 into multiple random number series by the method described in FIG. 3 using the common key 112 (121). After the dividing, the encoder 120 generates the parity check symbols series-by-series (the error-correcting coding). The parity check symbols generated independently are transferred to a multiplexer 153 together. The parity check symbols and the encrypted actual data are multiplexed by the multiplexer 153, transferred to an optical transmitting unit 160, and then transmitted to the transmission channel 202.

At the receiver side 300, a detector 330 receives random numbers data transmitted via the transmission channel 201, and a detector 360 receives the encrypted actual data and the parity check symbols transmitted via the transmission channel 202. The random numbers data of the former are transferred to the error correcting code decoder 320. The encrypted actual data and the parity check symbols of the latter are transferred to a demultiplexer 353 and divided into two. The encrypted actual data is transferred to a decryptor 352, and the parity check symbols are transferred to the error correcting code decoder 320. The decoder 320 divides the random number data into the random number series using the common key 312 (321), and corrects errors using the parity check symbols of each series. The error-corrected data are transferred to a secret key generator 351 together. The secret key generator 351 generates a secret key using the same algorithm as the secret key generator 151 in the transmitter (privacy amplification), and transfers the secret key to the decryptor 352, and the decryptor 352 decrypts the encrypted actual data into a plain text. A series of secret communication protocols are completed with these processes.

Third Embodiment

Figure 5:
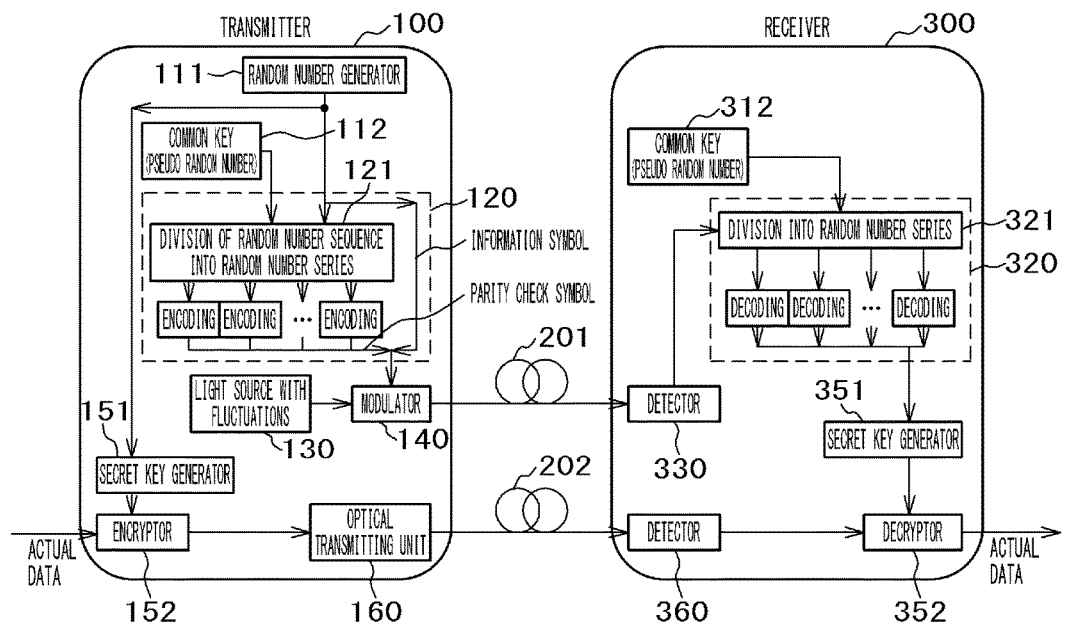
FIG. 5 is a block diagram illustrating another exemplary configuration of a transmitter and a receiver for implementing the secret communication according to the present invention.

In the second embodiment, the information symbols and the parity check symbols are transmitted via the transmission channel 201 and the transmission channel 202, respectively, using the systematic code in which the information symbols are explicitly separated from the parity check symbols. However, the parity check symbols and the information symbols can be transmitted via the same transmission channel. An embodiment in this case is illustrated in FIG. 5. In this case, the multiplexer 153 and the demultiplexer 353 necessary in the second embodiment are unnecessary and the information symbols and the parity check symbols are transmitted and received through the same transmission channel, and therefore, there is an advantage in which synchronization between both symbols is easily established. On the contrary, the second embodiment has an advantage in which the parity check symbols are accurately transmitted and received through the ordinary transmission channel 202 with a low bit-error rate.

Fourth Embodiment

Figure 6:
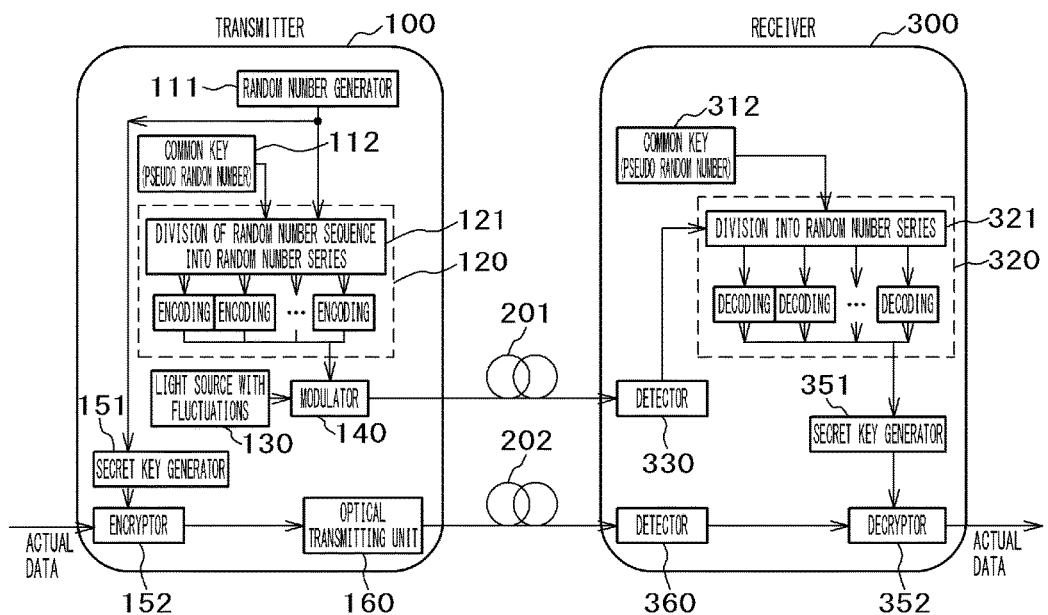
FIG. 6 is a block diagram illustrating another exemplary configuration of a transmitter and a receiver for implementing the secret communication according to the present invention.

The second and third embodiments have been described in connection with the example using the systematic code. Because the information symbols and the parity check symbols are separately transmitted in the second embodiment, it is necessary to use the systematic code, but in the third embodiment, because both symbols are transmitted and received through the same transmission channel, it is unnecessary to separate the information symbols and the parity check symbols. In this regard, it is possible to use the unsystematic code in which the information symbols and the parity check symbols are not separated, and the present embodiment relates to this case (FIG. 6). In FIGS. 4 and 5, the output of the random number generator 111 is sent directly to the modulator 140 as the information symbols, but in FIG. 6, there is no line that directly connects the random number generator 111 with the modulator 140, and the output of the random number generator 111 is first encoded and then transferred to the modulator 140. The other parts of the present embodiment are similar to those of the third embodiment except that the unsystematic code is used.

Fifth Embodiment

The present invention achieves secret communication using the three elements of the fluctuations (bit errors), an error-correcting code, and a common key cooperatively. The first to fourth embodiments have mainly described the usage of the error correcting code and the common key under the assumption that the bit-error rate is appropriately controlled. Because the redundancy of the error correcting code is decided according to the amount of bit errors (the magnitude of fluctuations), the magnitude of the fluctuations must be controlled. Anything can be the origin of the fluctuations as long as they are sufficiently random. A condition is that phase fluctuations are used in a phase-modulation scheme and amplitude fluctuations are used in an amplitude-modulation scheme. Those fluctuations are necessary for assuring secrecy. However, other undesirable fluctuations (noises) should be small. One of practical methods satisfying this requirement is to use the phase fluctuations of carrier light that is output from a laser diode (LD) operating nearby the threshold. This method has excellent properties as well such that the device configuration is simple and the randomness of the phase fluctuations are sufficient. For this reason, the following embodiment will use the phase fluctuations of an LD output as an example.

When an LD operates nearby the threshold, coherence is low and frequency fluctuations are large. Let frequency fluctuation be $\delta\omega$. The phase fluctuation in that case is given by $\delta\varphi=\int\delta\omega dt$. As apparent from the integral form, the phase fluctuation is generated by the passage of time. To use this property, a differential phase modulation scheme is effective, in which the phase difference between neighboring slots is used. Among the differential phase modulation schemes, differential phase-shift keying (DPSK) that is binary coding is most basic. The following description will proceed in accordance with the DPSK scheme.

Further, the case of binary or more, that is, multi-value communication can be achieved as binary communication is done. For example, differential quaternary phase-shift keying (DQPSK) can deal with a four-value signal. Other multi-value formats also can be achieved similarly in principle. The DPSK uses an asymmetric interferometer 331 at a receiver (FIG. 7), wherein the phases of neighboring slots interfere. Because the asymmetric interferometer 331 has the time difference between the two optical paths, phase fluctuation is added. The present invention uses this fluctuation (a bit error) as the origin of the secret capacity.

Figure 7:
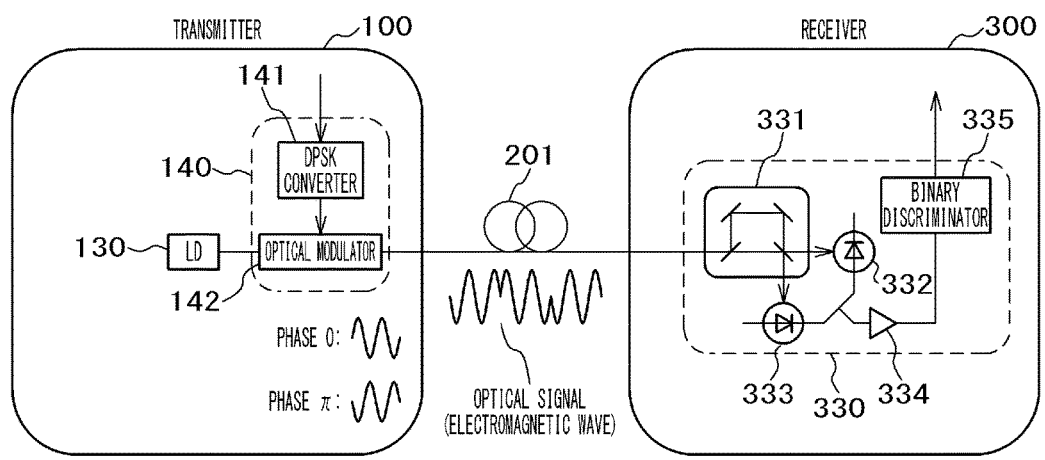
FIG. 7 is a block diagram illustrating the details of an exemplary configuration of a modulator and an optical detector in the case of a DPSK format.

Because an LD is used as the light source in the present embodiment, the light source 130 with the fluctuations is denoted by an "LD" in FIG. 7. The phase fluctuations of the LD can be stably controlled by injection current. Because a differential signal format is used in the DPSK, it is necessary to convert a signal value before signal transmission. A DPSK converter 141 in FIG. 7 is provided for this purpose. For example, let phases superimposed on carrier light be "00π0ππ." The differential phases corresponding to the difference between slots is "0πππ0." The actual signal is the latter, that is, "0πππ0." However, the actual modulation performed in the transmitter is the former, that is, "00π0ππ." The conversion for this purpose is performed by the DPSK converter 141. The image of a phase modulation is illustrated in the transmitter of FIG. 7.

The receiver has the asymmetric interferometer 331 to perform differential detection, where signal light is shifted by one slot to have interference, and the resulting signal light is detected with optical detectors 332 and 333. A basic operation principle is as follows: if a differential phase is "0," the signal light is detected by the optical detector 332; and if a differential phase is "π," the signal light is detected by the optical detector 333. The optical detectors 332 and 333 have a balanced arrangement, and common non-signal components incident on both detectors cancel. A signal detected at the optical detectors 332 and 333 is transferred to a binary discriminator 335 through an amplifier 334 and is judged and output as binary signals of "0" and "1."

The present embodiment uses the phase fluctuations of the carrier light that is an LD output as a fluctuation source. Thermal fluctuations, a random number generator, or the like can be used as fluctuation sources (Patent Documents 2 to 4).

Sixth Embodiment

The present invention assumes that the fluctuations are appropriately controlled. In the fifth embodiment, the phase fluctuations of an LD output are used as a fluctuation source. The magnitude of the phase fluctuations is controlled by the injection current to the LD, and this control is performed by a constant current source serving as an external control system. The constant current source is configured with an electric circuit and thus generates a certain level of noise. For this reason, an external noise is likely to be added to the LD. Further, it is necessary to maintain a constant operation temperature for a stable operation of the LD, and thus a temperature controller is used. This may also serve as an external noise source. Further, various noises are likely to be added even in the middle of the transmission channel or in the receiver. A countermeasure for the external noises will be described in the present embodiment.

Generally, the spectra of the external noises have relatively low frequency components compared with a bit rate of signals. For this reason, the influence of those noises is almost the same between neighboring signal slots. Thus, most of the external noises can be removed by differentiating the signals of the neighboring slots. In other words, when signals are transmitted and received in the differential format, the low frequency noises can be automatically removed.

Figures 8A, 8B:
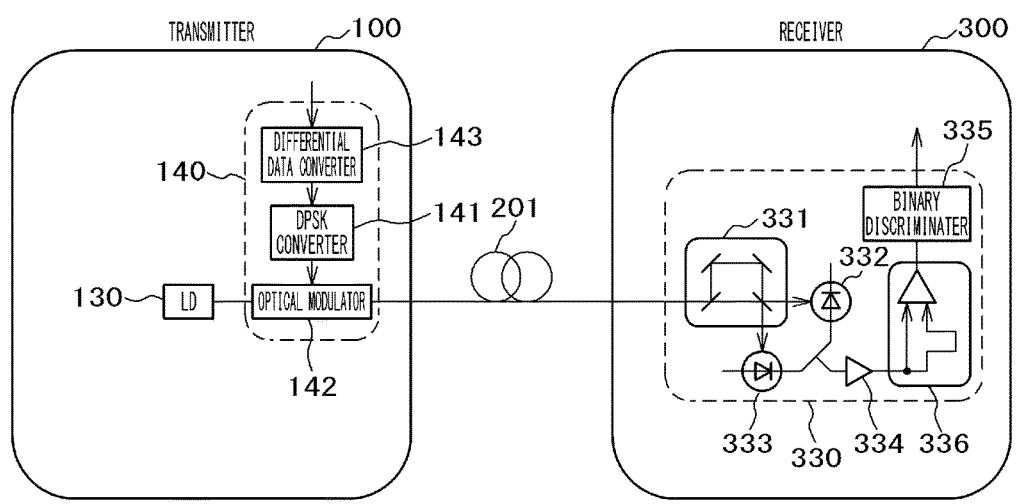
FIG. 8A is a block diagram illustrating the details of an exemplary configuration of a modulator and an optical detector where transmission signals are differentiated in addition to a DPSK format.
FIG. 8B is a diagram illustrating process content in a transmitter and a receiver illustrated in FIG. 8A and a signal sequence corresponding thereto.

The fifth embodiment has described the method of transmitting and receiving signals in the DPSK format. This is one of differential formats. However, this is a form to appropriately control the bit error rate. Further differentiating is necessary in order to remove the external noises. An example for this purpose is illustrated in FIGS. 8A and 8B. Compared to FIG. 7, a differential data converter 143 is added to the transmitter, and a demodulator 336 for restoring a differential phase to an original data phase is added to the receiver.

An example of data conversion is illustrated in FIG. 8B. When data (random number data) input to the modulator 140 is "100101 . . . " ((a) in FIG. 8B), differential data is "0111001 . . . " ((b) in FIG. 8B). This can be checked through that the difference between successive data in (b) gives data in (a). Here, there are two types of differential data that give the same original data because the number of data is increased by one in the conversion into the differential data. In (b), not only "0111001 . . . " but also "1000110 . . . " that is the inversion of the former give the same original data. The present embodiment employs the former. This is a method of selecting "0" as first data.

The conversion to the DPSK format is similarly performed, and "0111001 . . . " ((b) in FIG. 8B) serving as the differential data is converted into "00101110 . . . " ((c) in FIG. 8B). Here, "0" is selected as first data. The optical modulator 142 superimposes phase 0 for "0" and phase π for "1" ((d) in FIG. 8B).

In the receiver, the DPSK signal is detected with the asymmetric interferometer (DPSK demodulator) and the balanced detectors. The detected phases are "0ππ00π . . . " ((e) in FIG. 8B). Because the phases still correspond to differential data at this stage, the demodulator 336 takes the difference between the successive phases and outputs "π00π0π . . . " ((f) in FIG. 8B). The phases at this stage correspond to original data, and original data is restored by judging the phase 0 to be "0" and the phase π to be "1" through the binary discriminator ((g) in FIG. 8B).

REFERENCE SIGNS LIST 100 transmitter
111 random number generator
112 common key (pseudo random number generator)
120 encoder
121 unit that divides random number sequence into random number series
130 light source with fluctuations
140 modulator
141 DPSK format converter
142 optical modulator
143 differential data converter
151 secret key generator
152 encryptor
153 multiplexer
160 optical transmitting unit
201 transmission channel
202 transmission channel
300 receiver
312 common key (pseudo random number generator)
320 decoder
321 unit that divides random number sequence into random number series
330 detector
331 asymmetric interferometer (DPSK demodulator)
332 optical detector
333 optical detector
334 amplifier
335 binary discriminator
336 demodulator
351 secret key generator
352 decryptor
353 demultiplexer
360 optical detector

The invention claimed is:
1. A transmitter that transmits a random number sequence including bit errors to improve security in optical communication between the transmitter and a receiver, the transmitter comprising:
a transmitter unit; and
an encoder that is executed by the transmitter unit and configured to encode an original random number sequence,
wherein the transmitter unit is configured to:
use a common key shared in advance between the transmitter and the receiver that receives signals transmitted from the transmitter,
divide the original random number sequence into two or more of random number series using each bit value of the common key, where the each bit value of the common key fixedly corresponds with each slot of the original random number sequence, and the two or more of the random number series are determined solely based on the each bit value of the common key, where the each slot of the original random number sequence denotes placement of each bit value of the original random number sequence, and
encode each of the divided random number series independently, and wherein partial analysis of the common key by an unauthorized recipient is prevented by setting an encoding unit of the random number series to be equal to or larger than a length of the common key, parity check symbols for error correction are generated in accordance with the common key, and the parity check symbols are transmitted to the receiver via a first transmission channel through which the random number sequence is transmitted to the receiver, or via a second transmission channel through which actual data are transmitted to the receiver, and a process of reducing a total number of random numbers to within secret capacity determined by a bit error rate is performed for the original random number sequence, and actual data are encrypted using the reduced random numbers that function as a secret key and then transmitted.

2. The transmitter according to claim 1,
wherein an error correcting code is used, a total number of error-correctable bits in each encoding unit is limited to a total number of error-correctable bits necessary for an authorized recipient in the error correction, and correction capability more than the necessity is not provided.

3. The transmitter according to claim 1,
wherein the transmitter unit is configured to generate pseudo random numbers using the common key as a seed key, and the pseudo random numbers are used as a new common key.

4. The transmitter according to claim 1,
wherein the random number sequence is transmitted using a differential format in which a difference between neighboring slots is a signal, which excludes an influence of external noises on the random number sequence.

5. A receiver that receives a random number sequence including bit errors from a transmitter to improve security in optical communication between the transmitter and the receiver, the receiver comprising:
a receiver unit;
a detector that is executed by the receiver unit and configured to detect the random number sequence including the bit errors; and
a decoder that is executed by the receiver unit and configured to decode the detected random number sequence,
wherein the receiver unit is configured to receive the random number sequence including the bit errors which is a random number sequence encoded in the transmitter,
the receiver unit is configured to:
use a common key shared in advance between the receiver and the transmitter that transmits signals received by the receiver, and
divide the random number sequence including the bit errors into two or more of random number series using the common key, where each bit value of the common key fixedly corresponds with each slot of the random number sequence including the bit errors, and the two or more of the random number series are determined solely based on the each bit value of the common key, where the each slot of the random number sequence denotes placement of each bit value of the random number sequence, and
each of the random number series is decoded independently, and wherein partial analysis of the common key by an unauthorized recipient is prevented by setting an encoding unit of the random number series to be equal to or larger than a length of the common key in the transmitter, and parity check symbols for error correction are generated in accordance with the common key in the transmitter, and the parity check symbols are transmitted to the receiver via a first transmission channel through which the random number sequence is transmitted to the receiver, or via a second transmission channel through which actual data are transmitted to the receiver, a process of reducing a total number of random numbers to within secret capacity determined by a bit error rate is performed for an original random number sequence which is generated from the random number sequence including the bit errors, and actual data are encrypted using the reduced random numbers that function as a secret key and then transmitted from the transmitter, and the receiver receives the encrypted actual data.

6. The receiver according to claim 5,
wherein the random number series encoded with an error-correcting code in the transmitter is received, a total number of error-correctable bits in each encoding unit is limited to a total number of error-correctable bits necessary for an authorized recipient in error correction, and correction capability more than the necessity is not provided.

7. The receiver according to claim 5,
wherein the random number sequence transmitted from the transmitter is received using a differential format in which a difference between neighboring slots is a signal, which excludes an influence of external noises on the random number sequence.

8. A communication system in which a random number sequence including bit errors is used to improve security in optical communication between a transmitter and a receiver, the communication system comprising:
the transmitter that transmits the random number sequence including the bit errors;
the receiver that receives the random number sequence including the bit errors; and
a transmission channel through which the random number sequence including the bit errors is transmitted between the transmitter and the receiver,
wherein the transmitter includes a transmitter unit, and an encoder that is executed by the transmitter unit and configured to encode an original random number sequence,
the transmitter unit is configured to:
use a common key shared in advance between the transmitter and the receiver that receives signals transmitted from the transmitter,
divide the original random number sequence into two or more of random number series using each bit value of the common key, where the each bit value of the common key fixedly corresponds with each slot of the original random number sequence, and the two or more of the random number series are determined solely based on the each bit value of the common key, where the each slot of the original random number sequence denotes placement of each bit value of the original random number sequence, and
encode each of the divided random number series independently, the receiver includes a receiver unit, a detector that is executed by the receiver unit and configured to detect the random number sequence, and a decoder that is executed by the receiver unit and configured to decode the detected random number sequence, the receiver unit is configured to receive the encoded random number sequence including the bit errors, and the receiver unit is configured to:

use the common key shared in advance between the receiver and the transmitter that transmits signals received by the receiver, and divide the random number sequence including the bit errors into two or more of random number series using the common key, where each bit value of the common key corresponds with each slot of the random number sequence including the bit errors based on the predetermined correspondence relation, and the two or more of the random number series are determined solely based on the each bit value of the common key, where the each slot of the random number sequence denotes placement of each bit value of the random number sequence, and the transmission channel includes a first transmission channel through which the random number sequence including the bit errors is transmitted from the transmitter to the receiver and a second transmission channel through which actual data are transmitted to the receiver, and wherein partial analysis of the common key by an unauthorized recipient is prevented by setting an encoding unit in the encoding of the random number series to be equal to or larger than a length of the common key in the transmitter, parity check symbols for error correction are generated in accordance with the common key in the transmitter, and the parity check symbols are transmitted to the receiver via the first transmission channel or via the second transmission channel, and a process of reducing a total number of random numbers to within secret capacity determined by a bit error rate is performed for the original random number sequence, and actual data are encrypted using the reduced random numbers that function as a secret key and then transmitted from the transmitter to the receiver.

9. The communication system according to claim 8, wherein the random number sequence is transmitted from the transmitter to the receiver using a differential format in which a difference between neighboring slots is a signal, which excludes an influence of external noises on the random number sequence.

\* \* \* \* \*